(12) United States Patent
Hong et al.

(10) Patent No.: US 7,542,280 B2
(45) Date of Patent: Jun. 2, 2009

(54) MOUNTING APPARATUS FOR DATA STORAGE DEVICE

(75) Inventors: Lin-Yun Hong, Shenzhen (CN);
Hsuan-Chen Chen, Tu-Cheng (TW);
Chien-Li Tsai, Tu-Cheng (TW);
Chun-Chi Liang, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 204 days.

(21) Appl. No.: 11/309,715

(22) Filed: Sep. 15, 2006

(65) Prior Publication Data
US 2007/0162915 A1    Jul. 12, 2007

(30) Foreign Application Priority Data
Dec. 23, 2005   (TW) ............................ 94222591 U

(51) Int. Cl.
*H05K 5/00*   (2006.01)
*H05K 7/00*   (2006.01)
*G06F 1/16*   (2006.01)

(52) U.S. Cl. ..................................... 361/685

(58) Field of Classification Search ................. 361/685, 361/683
See application file for complete search history.

(56) References Cited

U.S. PATENT DOCUMENTS

| | | | |
|---|---|---|---|
| 6,370,022 B1 * | 4/2002 | Hooper et al. | 361/685 |
| 6,375,287 B1 * | 4/2002 | Lai | 312/223.2 |
| 6,388,874 B1 * | 5/2002 | Liang et al. | 361/685 |
| 6,671,180 B2 * | 12/2003 | Le et al. | 361/726 |
| 6,899,407 B1 * | 5/2005 | Lai | 312/223.2 |
| 6,932,447 B2 * | 8/2005 | Chen et al. | 312/223.2 |

* cited by examiner

Primary Examiner—Anatoly Vortman
Assistant Examiner—Quinn Hunter
(74) Attorney, Agent, or Firm—Wei Te Chung

(57) ABSTRACT

A mounting apparatus for holding a data storage device that defines a mounting hole in a side wall, includes a bracket for holding the data storage device therein, and an operating member movably attached to the sidewall of the bracket. The bracket includes a sidewall. A tab extends from the sidewall. A locking portion protrudes in from the tab near a free end of the tab for engaging in the mounting hole of the data storage device. The operating member includes a cantilever-shaped resilient driving portion for engaging with the tab to retract the locking portion from the mounting hole of the data storage device.

14 Claims, 4 Drawing Sheets

MOUNTING APPARATUS FOR DATA STORAGE DEVICE

FIELD OF THE INVENTION

The present invention relates to mounting apparatuses, and more particularly to a mounting apparatus which readily allows securely installing or removing a data storage device to or from an electronic device.

DESCRIPTION OF RELATED ART

An electronic apparatus, such as a computer, or a server, usually includes data storage devices, such as hard disk drives, compact disk read-only memory (CD-ROM) drives, digital video disc (DVD) drives, and floppy disk drives. These devices are typically added to increase the functionality of the electronic apparatus as desired by a user. However, the installation of such devices in the electronic apparatus is usually labor-intensive.

The installation of a hard disk drive in a computer typically involves using screws to attach the hard disk drive to a bracket on a chassis of the computer. Usually, these screws are so small that it is difficult to install them. It is laborious and time-consuming to manipulate the screws. Additionally, because of their small size, the screws are easier to be dropped by an assembler into the computer. Some accidental damage may occur in the computer.

To address the aforementioned problems, a plurality of mounting apparatuses is invented to reduce the number of needed screws. For example, a pair of detachable rails is attached to opposite sides of a data storage device with screws. The data storage device slides into and is secured to a drive bracket. However, the screws have to be removed to detach the rails from the data storage device before replacing the data storage device.

What is desired, therefore, is a mounting apparatus which conveniently and securely holds a data storage device in a bracket.

SUMMARY OF THE INVENTION

In one preferred embodiment, a mounting apparatus for holding a data storage device that defines a mounting hole in a side wall, includes a bracket for holding the data storage device therein, and an operating member movably attached to the sidewall of the bracket. The bracket includes a sidewall. A tab extends from the sidewall. A locking portion protrudes in from the tab near a free end of the tab for engaging in the mounting hole of the data storage device. The operating member includes a cantilever-shaped resilient driving portion for engaging with the tab to retract the locking portion from the mounting hole of the data storage device.

Other advantages and novel features will become more apparent from the following detailed description of preferred embodiments when taken in conjunction with the accompanying drawings, in which:

DETAILED DESCRIPTION OF THE INVENTION

Figure 1:
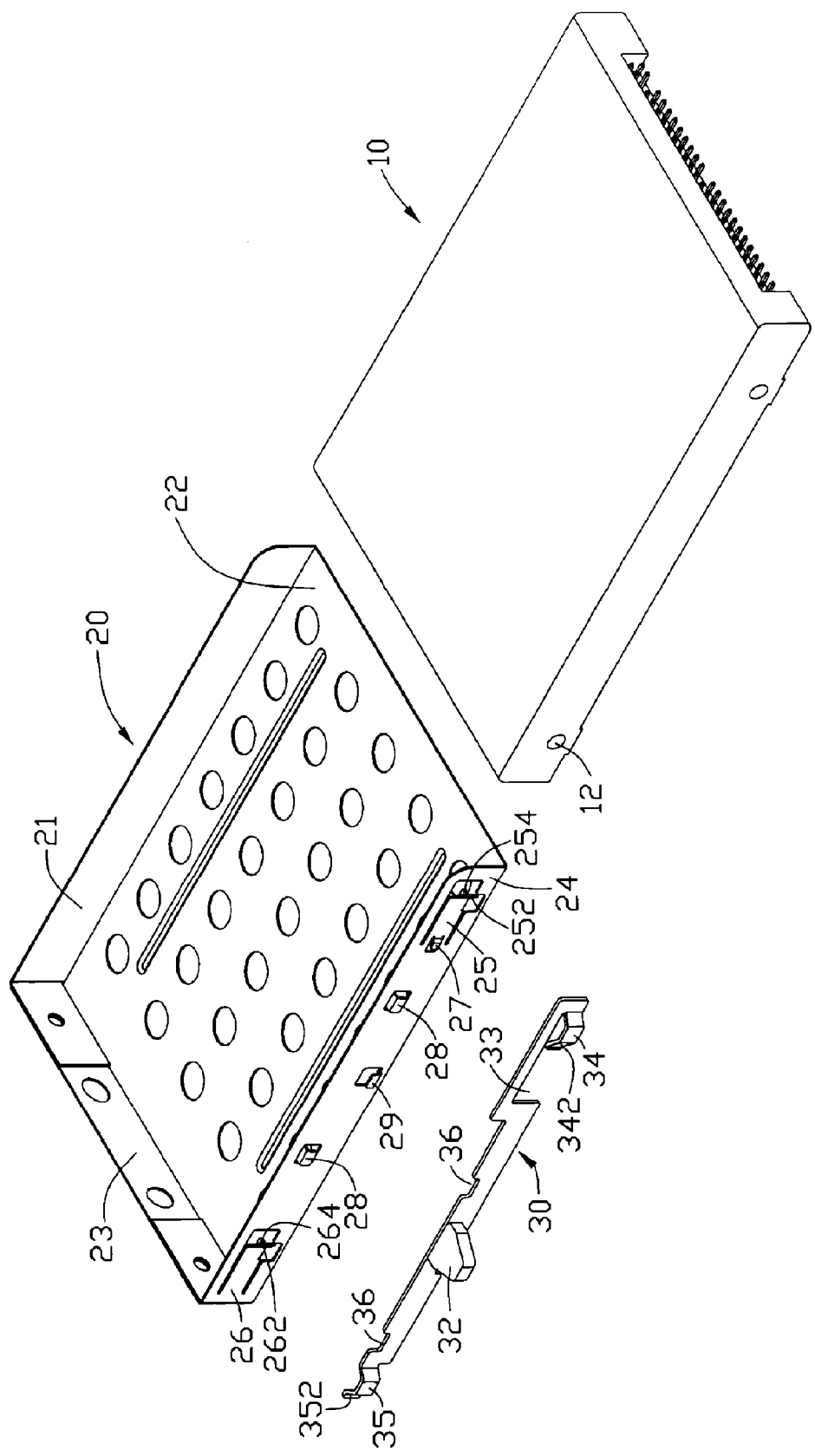
FIG. 1 is an exploded, isometric view of a mounting apparatus in accordance with a preferred embodiment of the present invention, together with a data storage device.

Referring to FIG. 1, in a preferred embodiment of the present invention, a mounting apparatus is provided for holding a data storage device 10. The mounting apparatus includes a bracket 20, and an operating member 30. Two mounting holes 12 are defined in a side wall of the data storage device 10.

Figure 2:
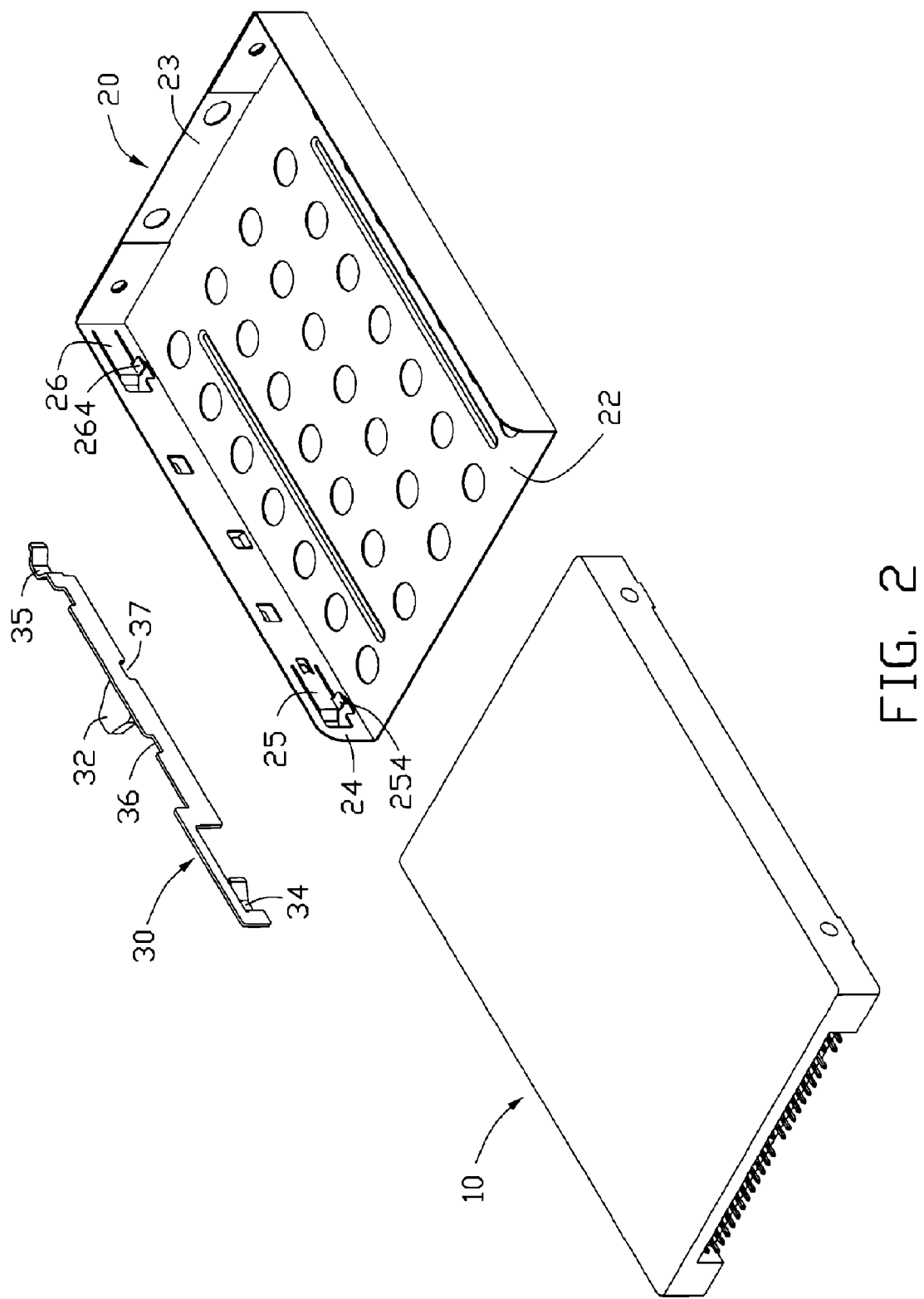
FIG. 2 is similar to FIG. 1, but viewed from another aspect.

Referring also to FIG. 2, the bracket 20 includes a base wall 22, a first sidewall 24 perpendicularly extending from a side of the base wall 22, a second sidewall 21 perpendicularly extending from an opposite side of the base wall 22, and an end wall 23 perpendicularly extending from an end of the base wall 22. An L-shaped first retaining portion 29 extends out and up from a middle portion of the first sidewall 24. Two L-shaped second retaining portions 28 respectively extend out and down from the first sidewall 24 at opposite sides of the first retaining portion 29. A first tongue-shaped tab 25 as an elastic portion and a second tongue-shaped tab 26 as an elastic portion extend from opposite ends of the first sidewall 24 away from the end wall 23. A first bending portion 252 slantingly extends out from a distal end of the first tongue-shaped tab 25. A first locking portion 254 protrudes in from a bottom side of the first tongue-shaped tab 25 in the vicinity of the first bending portion 252. A second bending portion 262 slantingly extends out from a distal end of the second tongue-shaped tab 26. A second locking portion 264 protrudes in from a bottom side of the second tongue-shaped tab 26 in the vicinity of the second bending portion 262. A blocking portion 27 extends from the first sidewall 24 at a root of the first tongue-shaped tab 25 toward the end wall 23.

The operating member 30 has a generally elongated body. A handle 32 protrudes out from the operating member 30. Two first cutouts 36 are defined in a top side of the operating member 30 at opposite sides of the handle 32. A second cutout 37 is defined in a bottom side of the operating member 30 between the first cutouts 36. A third cutout 33 is defined in the bottom side of the operating member 30 in the vicinity of one end of the operating member 30. A first driving portion 34 corresponding to the first tongue-shaped tab 25 extends from the operating member 30 into the third cutout 33. The first driving portion 34 is a bridge-shaped cantilever and includes a first incline 342 at a free end thereof. A bridge-shaped second driving portion 35 extends from the other end of the operating member 30. The second driving portion 35 is a bridge-shaped cantilever and includes a second incline 352 at a free end thereof.

Figure 3:
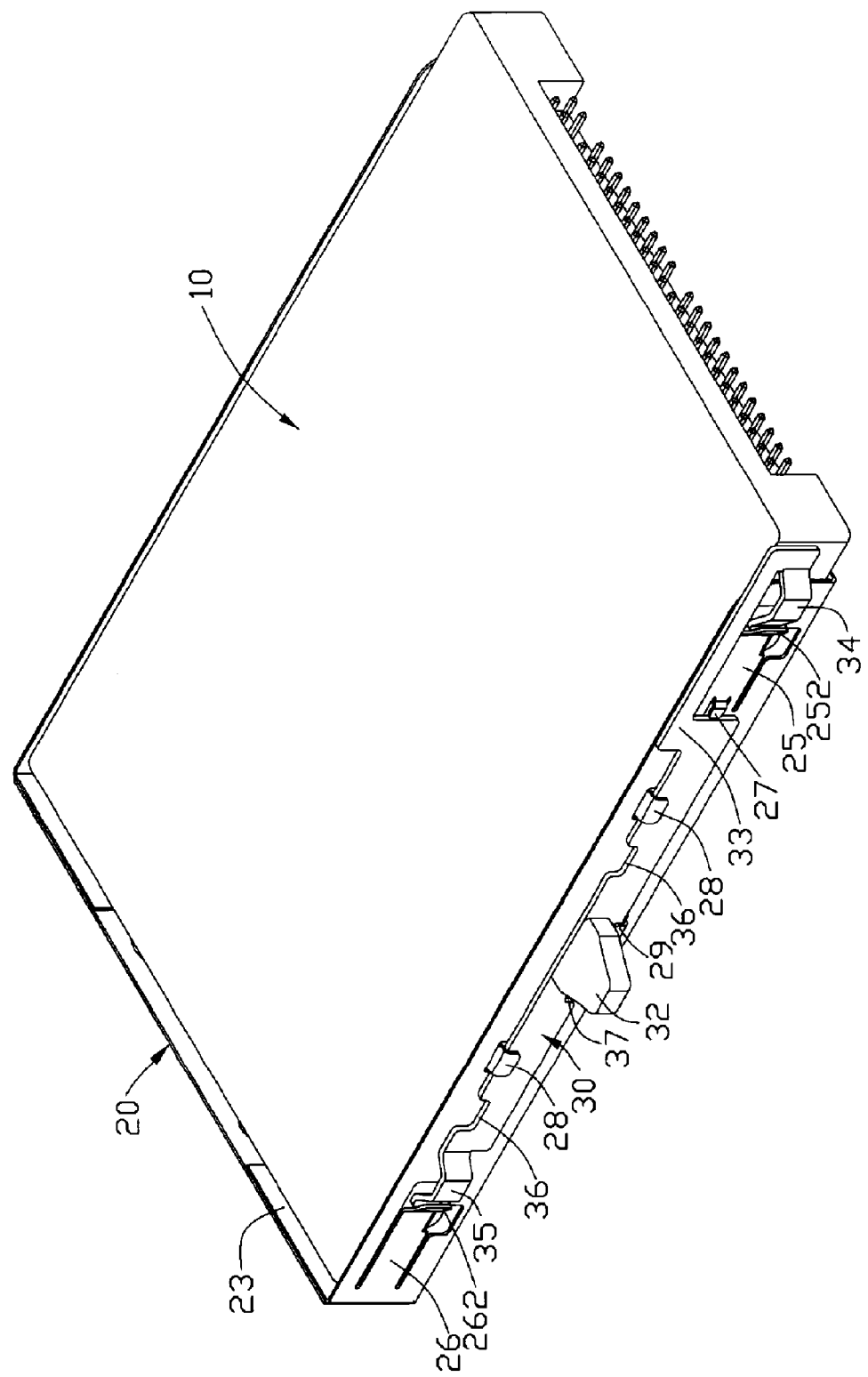
FIG. 3 is an assembled view of FIG. 1, showing the mounting apparatus in a locked state.

Referring also to FIG. 3, in assembly, the operating member 30 is placed in the vicinity of the first sidewall 24 of the bracket 20, with the first and second cutouts 36, 37 thereof aligning with the corresponding second and first retaining portions 28, 29 respectively. The operating member 30 is pressed firmly against the first sidewall 24 and then moved toward the end wall 23 to be slidably received in and retained by the first and second retaining portions 29, 28 of the first sidewall 24. During this time, the blocking portion 27 is first depressed then rebounds when the operating member 30 passes beyond it, thus trapping the operating member 30 within the first and second retaining portions 29, 28 and preventing accidental withdrawal of the operating member 30 when used. At this time, the operating member 30 is positioned just short of the first bending portion 252 and the second bending portion 262 in a locked position at which the first and second locking portion 254, 264 are located inside of the first sidewall 24 and are engagable into the mounting holes 12 of the data storage device 10 if the data storage device 10 is received in the bracket 20.

Figure 4:
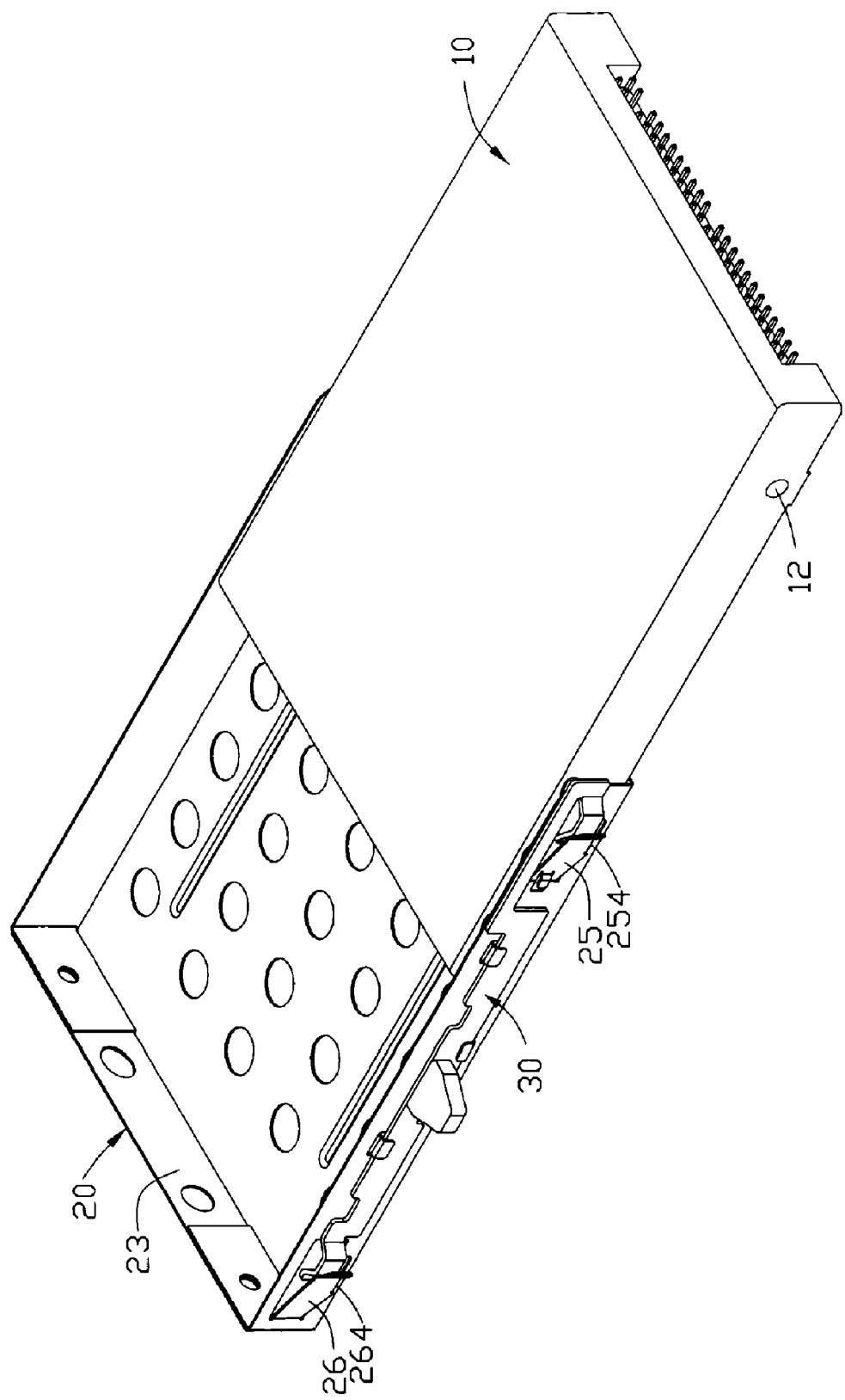
FIG. 4 is an assembled view of FIG. 1, showing the mounting apparatus in an unlocked state.

Referring also to FIG. 4, in preparation for assembling the data storage device 10 to the bracket 20, the handle 32 of the operating member 30 is operated to move the operating member 30 toward the end wall 23 of the bracket 20. The first incline 342 of the first driving portion 34 of the operating member 30 slides on an inner surface of the first bending portion 252 of the first tongue-shaped tab 25, and the second incline 352 of the second driving portion 35 of the operating member 30 slides on an inner surface of the second bending portion 362 of the second tongue-shaped tab 36. Then the first and second tongue-shaped tabs 25, 26 are deformed to remove the first and second locking portions 254, 264 out. In assembling the data storage device 10, the data storage device 10 is put into the bracket 20 from an end opposite to the end wall 23 until the first and second locking portions 254, 264 aim at the side wall of the data storage device 10. The operating member 30 is moved back to its original position, and the first and second tongue-shaped tabs 25, 26 rebound. The first and second locking portions 254, 264 are resiliently depressed by the side wall of the data storage device 10. The data storage device 10 is pushed further, the first and second locking portions 254, 264 slide on the side wall of the data storage device 10 until the first and second locking portions 254, 264 engage in the corresponding mounting holes 12 of the data storage device 10. Thus, the data storage device 10 is mounted in the bracket 20.

To detach the data storage device 10 from the bracket 20, the handle 32 of the operating member 30 is operated to move the operating member 30 toward the end wall 23 of the bracket 20. The first incline 342 of the first driving portion 34 of the operating member 30 slides on an inner surface of the first bending portion 252 of the first tongue-shaped tab 25, and the second incline 352 of the second driving portion 35 of the operating member 30 slides on an inner surface of the second bending portion 362 of the second tongue-shaped tab 36. Then the first and second tongue-shaped tabs 25, 26 are deformed to retract the first and second locking portions 254, 264 from the corresponding mounting holes 12 of the data storage device 10. Thus, the data storage device 10 is easily taken out from the bracket 20.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A mounting apparatus for holding a data storage device that defines a mounting hole in a side wall, the mounting apparatus comprising:
   a bracket for holding the data storage device therein comprising a sidewall, a tab extending from the sidewall, a locking portion protruding in from the tab near a free end of the tab for engaging in the mounting hole of the data storage device; and
   an operating member movably attached to the sidewall of the bracket, the operating member comprising a driving portion for driving the tab outward to retract the locking portion from the mounting hole of the data storage device; wherein the driving portion protrudes outwardly from the operating member and is insertable into and slides along an inside of the tab when the operating member slides along the sidewall; wherein the driving portion is a bridge-shaped cantilever and has an incline formed at a free end thereof, the incline being insertable into and sliding along an inside of the tab.

2. The mounting apparatus as claimed in claim 1, wherein a plurality of retaining portions extend from the sidewall of the bracket for retaining the operating member.

3. The mounting apparatus as claimed in claim 2, wherein a plurality of cutouts corresponding to the retaining portions is defined in the operating member for avoiding the retaining portions when mounting the operating member to the sidewall of the bracket 4. The mounting apparatus as claimed in claim 2, wherein a blocking portion protrudes from the sidewall of the bracket for blocking the operating member to prevent it sliding away from the sidewall.

5. The mounting apparatus as claimed in claim 1, wherein a bending portion is formed out from the free end of the tab, the driving portion comprises an incline for sliding on the bending portion of the tab.

6. An assembly comprising:
   a data storage device defining a mounting hole in a side wall thereof;
   a bracket for holding the data storage device therein comprising a sidewall, a tab extending from the sidewall, a locking portion protruding in from the tab near a free end of the tab for engaging in the mounting hole of the data storage device; and
   an operating member movably attached to the sidewall of the bracket, the operating member comprising a driving portion for engaging with the tab to remove the locking portion from the mounting hole of the data storage device; wherein the driving portion protrudes outwardly from the operating member and is insertable into and slides along an inside of the tab when the operating member slides along the sidewall; wherein the driving portion is a bridge-shaped cantilever and has an incline formed at a free end thereof, the incline being insertable into and sliding along an inside of the tab.

7. The assembly as claimed in claim 6, wherein a plurality of retaining portions extend from the sidewall of the bracket for retaining the operating member.

8. The assembly as claimed in claim 7, wherein a plurality of cutouts corresponding to the retaining portions is defined in the operating member for avoiding the retaining portions when mounting the operating member to the sidewall of the bracket.

9. The assembly as claimed in claim 6, wherein a blocking portion protrudes from the sidewall of the bracket for blocking the operating member.

10. The assembly as claimed in claim 6, wherein a bending portion is formed from a distal end of the tab, the driving portion comprises an incline for engaging with the bending portion of the tab.

11. An assembly comprising:
    a data storage device defining a mounting hole in a side wall thereof;
    a bracket for holding the data storage device therein, the bracket comprising a sidewall facing the side wall of the data storage device, an elastic portion extending from the sidewall, a locking portion protruding in from the elastic portion for engaging in the mounting hole of the data storage device; and
    an operating member slidably attached to an outside of the sidewall, the operating member comprising a driving portion for urging the elastic portion outward to retract the locking portion from the mounting hole;

wherein the driving portion protrudes outwardly from the operating member and is insertable into and slides along an inside of the elastic portion when the operating member slides along the sidewall;

wherein the driving portion is bridge-shaped cantilever and has an incline formed at a free end thereof, the incline being insertable into and sliding along an inside of the elastic portion.

12. The assembly as claimed in claim 11, wherein a bending portion extends outward from a distal end of the elastic portion for guiding the driving portion inserting into the inside of the elastic portion.

13. The assembly as claimed in claim 11, wherein the bracket further comprises another elastic portion extending from the sidewall opposing the elastic portion, and the operating member further comprises another driving portion formed at one distal end thereof corresponding to the additional elastic portion.

14. The assembly as claimed in claim 13, wherein the operating member further comprises a handle protrudes outward from a portion thereof between the driving portion and the another driving portion.

* * * * *